US008695037B2

(12) United States Patent
Rosin et al.

(10) Patent No.: US 8,695,037 B2
(45) Date of Patent: *Apr. 8, 2014

(54) CONTENT NAVIGATOR GRAPHICAL USER INTERFACE SYSTEM AND METHOD

(75) Inventors: Robert Rosin, Franklin Lakes, NJ (US); Yumie Sonoda, San Mateo, CA (US)

(73) Assignees: Sony Corporation, Tokyo (JP); Sony Corporation Inc., Park Ridge, NJ (US)

( * ) Notice: Subject to any disclaimer, the term of this patent is extended or adjusted under 35 U.S.C. 154(b) by 845 days.

This patent is subject to a terminal disclaimer.

(21) Appl. No.: 11/985,637

(22) Filed: Nov. 15, 2007

(65) Prior Publication Data

US 2008/0072260 A1    Mar. 20, 2008

Related U.S. Application Data

(63) Continuation of application No. 09/201,018, filed on Nov. 30, 1998, now Pat. No. 7,313,805.

(51) Int. Cl.
*G06F 3/00* (2006.01)
*G06F 13/00* (2006.01)
*H04N 5/445* (2011.01)

(52) U.S. Cl.
USPC .................. 725/45; 725/43; 725/51; 725/52; 725/53; 725/61

(58) Field of Classification Search
None
See application file for complete search history.

(56) References Cited

U.S. PATENT DOCUMENTS

| 5,532,754 | A | 7/1996 | Young et al. .................. 348/569 |
| 5,546,529 | A | 8/1996 | Bowers et al. ................ 395/159 |
| 5,623,613 | A | 4/1997 | Rowe et al. .................... 395/353 |
| 5,673,089 | A | 9/1997 | Yuen et al. ..................... 348/734 |
| 5,818,935 | A | 10/1998 | Maa ................................ 380/20 |
| 5,844,620 | A * | 12/1998 | Coleman et al. ................ 725/54 |
| 5,880,768 | A | 3/1999 | Lemmons et al. ................ 348/1 |
| 5,905,492 | A | 5/1999 | Straub et al. .................. 345/333 |
| 5,940,073 | A | 8/1999 | Klosterman et al. .......... 345/327 |
| 5,959,621 | A | 9/1999 | Nawaz et al. .................. 345/329 |
| 5,990,883 | A | 11/1999 | Byrne et al. ................... 345/327 |
| 6,003,041 | A | 12/1999 | Wugofski ...................... 707/104 |
| 6,005,565 | A | 12/1999 | Legall et al. .................. 345/327 |
| 6,025,837 | A | 2/2000 | Matthews, III et al. ........ 345/327 |

(Continued)

FOREIGN PATENT DOCUMENTS

| JP | H01-230093 | 9/1989 |
| JP | H08-305692 | 11/1996 |

(Continued)

*Primary Examiner* — Jason J Chung
(74) *Attorney, Agent, or Firm* — Haverstock & Owens LLP

(57) ABSTRACT

In a system and method for enabling a user to simultaneously display a set of selectable categories, a set of channels related to a selected category, and individual content associated with a selected channel, of potential interest to the user. The system includes a graphical user interface which includes a set of selectable categories, sets of channels, each set of which includes channels which are relevant to each selectable category, and individual content, each of which is associated with a selectable channel and a selectable category. The graphical user interface uses hypertext markup language as the content description language, for enabling generation of guide information with links to related information and search functionality. The graphical user interface is further adapted to enable the selection of a category, a related channel, and associated individual content by the user. The internet websites and the internet content may be displayed in the same context as the video content.

23 Claims, 3 Drawing Sheets

(56) References Cited

U.S. PATENT DOCUMENTS

| | | | |
|---|---|---|---|
| 6,028,600 A | 2/2000 | Rosin et al. | 345/327 |
| 6,144,376 A | 11/2000 | Connelly | 345/327 |
| 6,177,931 B1 | 1/2001 | Alexander et al. | 345/327 |
| 6,230,324 B1 | 5/2001 | Tomita et al. | 725/51 |
| 6,239,794 B1 * | 5/2001 | Yuen et al. | 725/41 |
| 6,240,555 B1 | 5/2001 | Shoff et al. | 725/110 |
| 6,263,501 B1 | 7/2001 | Schein et al. | 725/39 |
| 6,268,849 B1 | 7/2001 | Boyer et al. | 345/327 |
| 6,272,484 B1 | 8/2001 | Martin et al. | 707/1 |
| 6,351,467 B1 | 2/2002 | Dillon | 370/432 |
| 6,442,598 B1 | 8/2002 | Wright et al. | 709/217 |
| 6,459,427 B1 | 10/2002 | Mao et al. | 345/327 |
| 6,594,682 B2 | 7/2003 | Peterson et al. | 709/102 |
| 6,604,242 B1 | 8/2003 | Weinstein et al. | 725/109 |
| 6,745,245 B1 | 6/2004 | Carpenter | 709/229 |
| 6,993,721 B2 | 1/2006 | Rosin et al. | 715/738 |
| 7,313,805 B1 | 12/2007 | Rosin et al. | 725/45 |
| 2001/0001160 A1 * | 5/2001 | Shoff et al. | 725/51 |
| 2003/0035007 A1 | 2/2003 | Wugofski | 345/764 |
| 2003/0066085 A1 | 4/2003 | Boyer et al. | 725/104 |

FOREIGN PATENT DOCUMENTS

| | | | | |
|---|---|---|---|---|
| JP | H09-091299 | 4/1997 | | G06F 17/30 |
| WO | WO 97/23997 | 3/1997 | | H04N 7/173 |
| WO | WO 99/35843 | 7/1999 | | H04N 7/16 |
| WO | WO 99/35845 | 7/1999 | | H04N 7/16 |

* cited by examiner

CONTENT NAVIGATOR GRAPHICAL USER INTERFACE SYSTEM AND METHOD

This patent application is a continuation of U.S. patent application Ser. No. 09/201,018, filed on Nov. 30, 1998, now U.S. Pat. No. 7,313,805 entitled CONTENT NAVIGATOR GRAPHICAL USER INTERFACE SYSTEM AND METHOD, which is also hereby incorporated by reference.

BACKGROUND OF THE INVENTION

1. Field of the Invention

This invention relates generally to improvements in content display and navigation systems, and, more particularly, to a new and improved system and method for enabling a user to simultaneously display a set of selectable categories, a set of channels related to a selected category, and individual content associated with a selected channel, of potential interest to the user, and for enabling the user to navigate therethrough.

2. Description of the Related Art

In order to enable access to individual content such as television programming content and interactive data content on the internet through the traditional television set, there have been appliances or set-top boxes such as cable TV and satellite receivers which have been developed. Such devices have been developed in conjunction with sources of television and internet content and connections to the content sources.

In such access devices, a grid-type user interface has been developed to interact with a menu selector and remote control device with directional controls for controlling the movement of the menu selector in the user interface, to enable the user to navigate through different screens in the user interface to access the desired content on the internet and in the TV programming. However, the user interface has not previously enabled efficient navigation among a multiplicity of categories, channels, and individual content of potential interest to the user, including interactive data content and/or television programming content.

Further, such previous devices have not enabled effective simultaneous display of a set of selectable categories, a set of channels related to a selected category, and individual content associated with a selected channel and a selected category, of potential interest to the user. Also, such devices previously have not enabled efficient use of substantial screen area for individual content including explanatory information and links for enabling exploration of other related content of potential user interest. Still further, prior devices have not provided formats for enabling comprehensive generation of guide information, and for providing links to information of relevance to the user and functionability for enabling effective searching therein.

In view of these considerations, an effective and efficient system must be implemented in an internet website and television programming system, for enabling a user to comprehensively display and navigate through a multiplicity of categories, channels, and individual content related to a subject of potential interest to the user.

Therefore, those concerned with the development and use of improved internet website and television channel display, access, and navigational systems and the like have recognized the need for improved systems and methods for navigating among a multiplicity of internet websites and television channels, for enabling a user to select categories, channels, and individual content of potential interest to the user.

The need has likewise been recognized for improved systems and methods for comprehensively displaying such sites and channels, while efficiently providing substantial screen areas for individual content, and for effectively generating guide information and providing information links for enhanced searching capabilities. Accordingly, the present invention fulfills these needs by providing efficient and effective display, access, and navigation among a multiplicity of internet websites and television channels, to enable the user to scroll through categories, channels related to the selected category, and individual content associated with the selected category to obtain information of potential interest to the user.

SUMMARY OF THE INVENTION

Briefly, and in general terms, the present invention provides a new and improved system and method for enabling a user to display, access, and navigate among a multiplicity of internet websites and television programming channels in an efficient and effective manner, to access a multiplicity of categories, channels, and individual content of potential interest to the user. The system and method provide comprehensive displaying of such categories, channels, and individual content, to enable effective access and navigation therein, while enabling the use of substantial screen area for individual content of potential interest, and providing access to linked information and increasing searching capabilities.

By way of example, and not by way of limitation, the present invention provides a new and improved system for enabling the simultaneous displaying of a multiplicity of categories, related channels, and associated individual content of potential interest to the user. The system may further enable navigation from the same screen among the categories, related channels, and associated individual content. The system may also enable the substantially instantaneous display of related channels upon selection of a category, and of associated individual content upon selection of a related channel. The system may also comprise an integrated television product or a separate set-top box, and may comprise a front-end for world-wide web access and television programming access.

More particularly, the present invention includes a system which includes a graphical user interface which includes a set of selectable categories, a plurality of sets of selectable channels, wherein each set of channels is related to a selected category, and individual content associated with each of the selectable channels. The system is further adapted to enable the user to navigate and select among the categories, related channels, and associated individual content, from the same screen.

The system is also adapted to enable the substantially instantaneous displaying of a set of channels related to a category upon selection of the category, and of individual content associated with a channel upon selection of the channel. The system is also adapted to enable the user to navigate interactively in the individual content. It further includes an area for displaying the individual content, which occupies a substantial portion of the screen.

Therefore, an advantage of the present invention is that it includes a system which includes a graphical user interface for enabling the user to effectively simultaneously and substantially instantaneously view a set of categories, a set of selectable channels related to a selected category, and associated individual content associated with a selected channel and a selected category, of potential interest to the user.

A further advantage is that the present invention enables the user to conveniently and efficiently navigate in and select categories, channels, and individual content in the same screen, without navigating through different screens.

Another advantage in accordance with the present invention is that a substantial area of the screen may be occupied by individual content which includes explanatory information and links to information related to the individual content of potential user interest, while enabling the displaying of the next program on a selected channel and providing efficient links to scroll to prior or subsequent programming.

Still another advantage is that the present invention includes an internet standard content description language for enabling efficient generation of guide information with links to related information and search functionality.

These and other objects and advantages of the invention will become apparent from the following more detailed description, when taken in conjunction with the accompanying drawings of illustrative embodiments.

DETAILED DESCRIPTION OF THE PREFERRED EMBODIMENTS

The present invention is directed to an improved system and method for enabling the simultaneous displaying of a set of categories, a set of related channels, and associated individual content, of potential interest to a user, in a screen of a display, and for enabling the user to navigate efficient and effectively from the same screen among the categories, channels, and content. The improved system and method provides an efficient graphical user interface for enabling the simultaneous displaying of the categories, channels, and content, and for effective navigation in the same screen therethrough, such that a set of channels related to a category are substantially instantaneously displayed upon selection of a category by the user, and the individual content associated with a channel is substantially instantaneously displayed upon selection of the channel by the user, and is adapted to enable interactive navigation therein.

Figure 1:
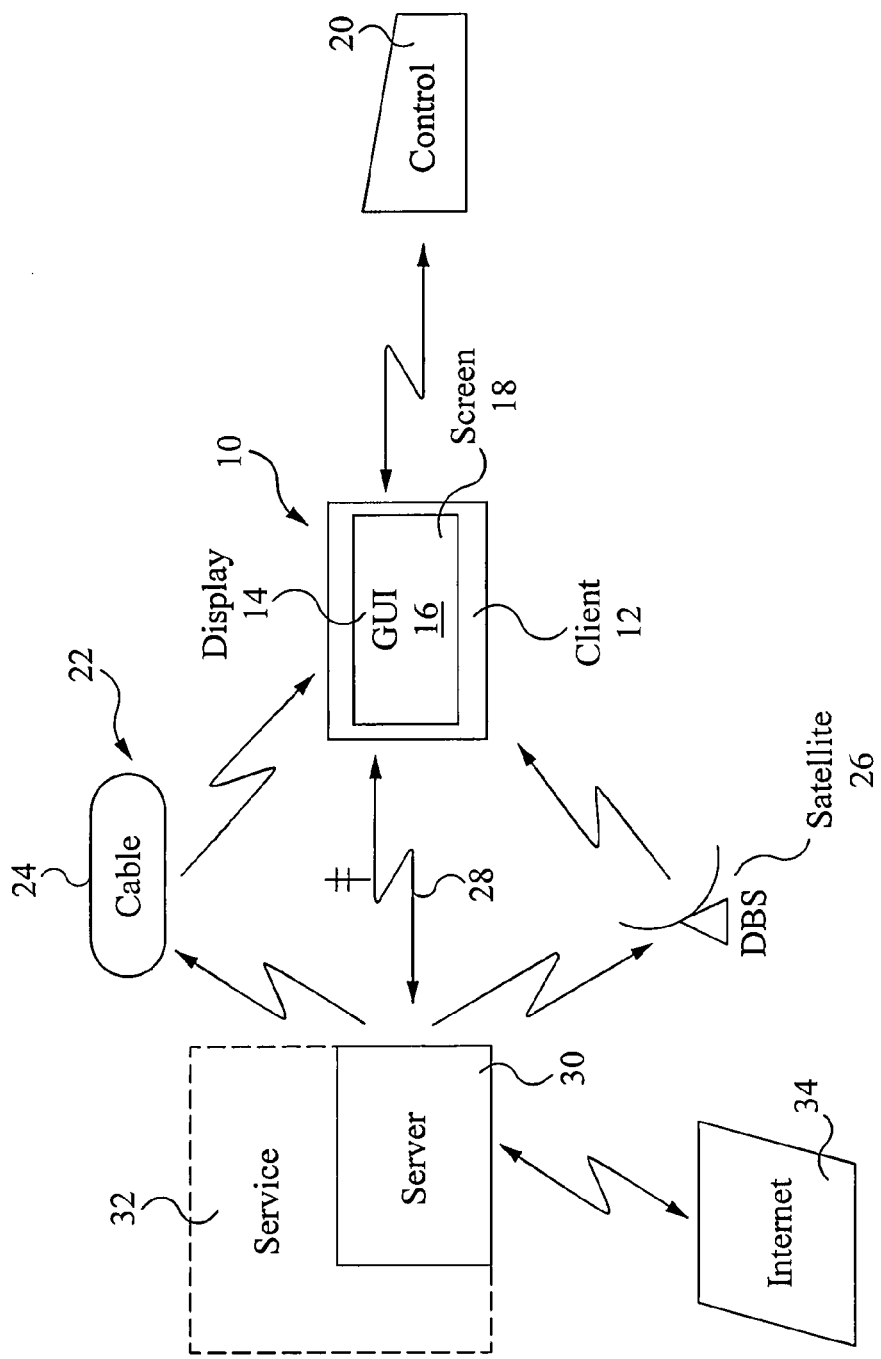
FIG. 1 is a block diagram illustrating a client-server system in accordance with the invention.
Figure 2:
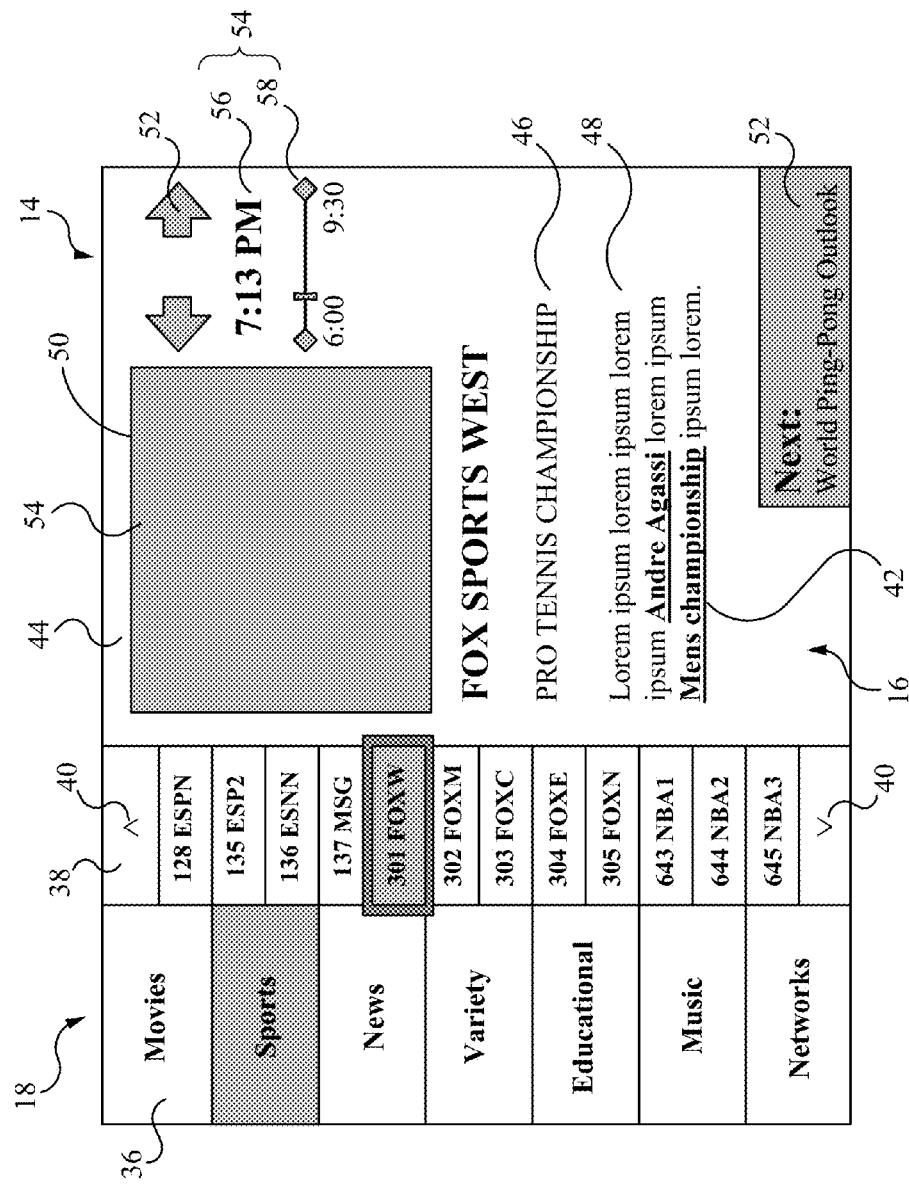
FIG. 2 illustrates a graphical user interface in a display in the practice of the invention.

Referring now to the drawings, wherein like reference numerals denote like or corresponding parts throughout the drawing figures, and particularly to FIGS. 1 and 2, in the present invention, the system 10 includes a client 12 which includes a display 14. The client 12 may comprise an integrated television product or a separate set-top box, and may comprise a front-end for world-wide web access and television programming access. A graphical user interface 16 is adapted to be displayed in the display 14, and in particular in a screen 18 in the display 14. The display 14 preferably includes a cursor or menu selector therein (not shown), which may be free or tabbed, and which is adapted to enable the user to click on a category, a channel, or individual content for selection thereof. The graphical user interface 16 may comprise a front-end for world-wide-web access and television programming access. The system 10 further includes a control device 20, which may comprise a remote control device for enabling the user to select a category, a channel, and individual content, in the graphical user interface 16. The control device 20 preferably includes directional controls (not shown) for controlling movement of the cursor or menu selector in the display 14.

As illustrated in FIG. 1, the system 10 of the present invention also includes connections to individual content sources 22 including interactive data and television programming sources, which are displayed on the display 14 responsive to selection by the user through the control device 20. The individual content sources 22 for interactive data may comprise a multiple-channel interactive data system, which may comprise a digital cable system 24 or a digital broadcasting satellite system (DBS) 26. The connections for the system 10 to the interactive data sources are adapted to enable downloading of interactive data along the data connection to the client 12, and may include a telephone modem 28 connected to a server 30 operated by a service 32, which server 30 is connected to the internet 34. The connections for the system 10 to the television programming sources are adapted to enable connection with television programming along the programming connection to the client 12, and may include the cable 24, the digital broadcasting satellite 26, or other suitable connection.

As shown in FIGS. 1 and 2, in accordance with the present invention, the graphical user interface 16 is adapted to be displayed in the screen 18 in the display 14, and may be comprised of a content description language, such as hypertext markup language (HTML). The system 10 may further include an element for decoding the HTML content (not shown). The graphical user interface 16 includes a set of categories 36 of potential interest to the user. One of the categories 36 may be selected at a given time, such as "SPORTS" as shown in the darkened area in FIG. 2 to indicate highlighting thereof upon selection by the user. A set of channels 38 that are relevant to the selected category 36 are displayed substantially instantaneously with the selection of the category 36 by the user. The channels 38 may be scanned by clicking on the arrows 40 to display channels 38 above and below the channels 38 shown. One of the channels 38 may be selected at a given time, such as "301 FOXW" as shown in the darkened area in FIG. 2 to indicate highlighting thereof upon selection by the user. Individual content 42 associated with the selected channel 38 may be displayed substantially instantaneously with the selection of the channel 38 by the user, as shown in FIG. 2, with portions of the individual content 42 shown in darkened areas therein to indicate highlighting thereof. The individual content 42 may include interactive data, which may include internet website content, and/or may include individual television programming, which may include television channel content.

In the present invention, the graphical user interface 16 further includes an area 44 for the selected individual content 42, such as the individual content 42 relating to the selected category 36 of "SPORTS" and the selected channel 38 of "301 FOXW". The content area 44 may preferably comprise a substantial portion of the graphical user interface 16 in the display 14. The cursor or menu selector may be adapted to click on a content area 44 and the content area 44 may then transition to a full-display mode. The graphical user interface 16 is adapted to enable the cursor or menu selector to tab freely and scroll through the set of categories 36 of potential interest to the user, and the set of channels 38 which are related to the selected category 36, and the individual content 42 associated with the selected category 36 and the selected channel 38. The system 10 may also enable automatic movement from a category 36 to another category 36, and automatic movement from a channel 38 to another channel 38 in a category 36, in the graphical user interface 16, to enable the user to passively view a plurality of categories 36, and to passively view a plurality of channels 38 in a category 36, before making a selection. The control device 20 is adapted to enable the user to scroll through the selectable categories 36, the channels 38, and the individual content 42 in the graphical user interface 16.

As seen in FIG. 2, in the content area 44 of the graphical user interface 16, the individual content 42 in each selectable channel 38 may include information 46 which is related to the selected channel 38, which may include content provider information, channel information, and/or program information 48. The program information 48 may comprise a program title, a program length, a program summary, and/or a program starting and ending time. The information 46 may further include information displayed in a window 50, which may include video clips and/or real time video, and which may be expressed as an HTML tag. The information displayed in the window 50 may be highlighted. The window 50 may be either an active window or a preview clip window.

Further in the present invention, the individual content 42 may also include live links 52 for enabling the user to link to other content or scroll forward to the next content or backward to the previous content. The linked content may include particular information relating to the program information 48. The control device 20 and cursor or menu selector in the display 14 may enable access to the linked information. The individual content 42 further includes extensions 54, which may include an embedded video extension displayed in the window 50, a current time extension 56, and a time relation extension 58 which comprises a graphical representation of the relation between the current time and the total range of time from the start to the end of a program.

Figure 3:
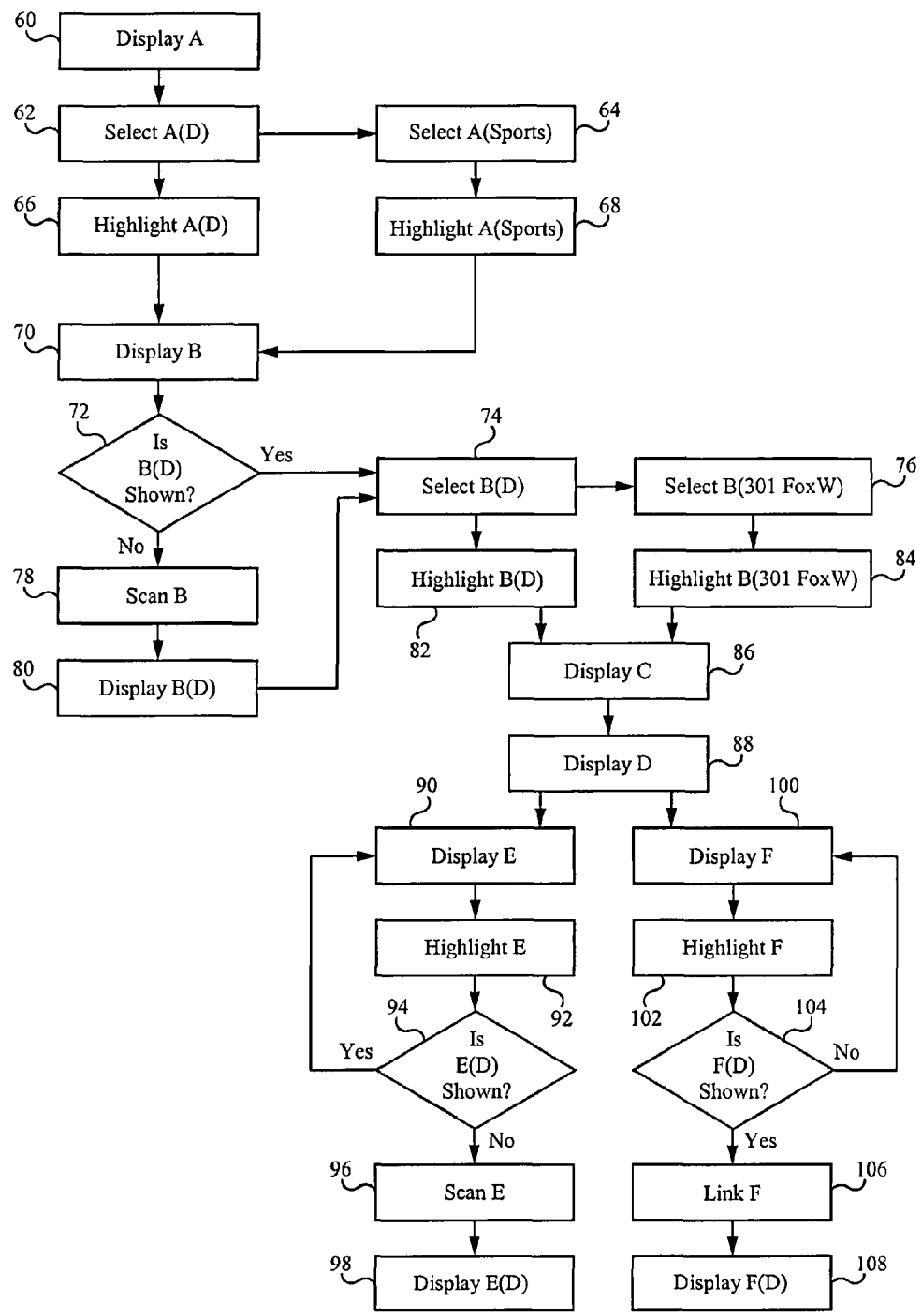
FIG. 3 is a flow chart illustrating a method of navigating through the graphical user interface in accordance with the present invention.

As seen in FIG. 3, which is a flow chart generally illustrating the display and navigation through the categories 36, channels 38, and content 42 in the screen 18 in the display 14, the categories of potential interest to the user, as represented by A, are initially displayed, at step 60. The user may then select a desired category as represented by A(D), at step 62. If for example the desired category is "SPORTS", it may be selected as represented by A(SPORTS), at step 64. The desired category A(D) selected is then highlighted, at step 66. If the desired category for example is the category A(SPORTS), it is then highlighted to indicate selection thereof, at step 68.

Upon selection and highlighting of the desired category A(D), a plurality of the channels as represented by B, which relate to the category A selected by the user, are then displayed, at step 70, substantially instantaneously upon the selection of the category A by the user. The plurality of channels in the set of channels B are thereby displayed simultaneously with the displaying of the categories A. If the plurality of channels in the set of channels B displayed include a channel which the user desires to select, at step 72, then the user may select the desired channel, as represented by B(D), at step 74. If the desired channel for example is "301 FOXW" it may be selected as represented by B(301 FOXW), at step 76. If, however, the desired channel is not displayed, the user may then scan the channels B which are prior to or after the plurality of channels B displayed, in the same screen 18, until a desired channel as represented by B(D) is displayed, at step 78. The desired channel B(D) then may be displayed, at step 80, and may then be selected, at step 74. The desired channel B(D) selected is then highlighted, at step 82. If for example the desired channel is B(301 FOXW), it is then highlighted to indicate selection thereof, at step 84.

Upon selection and highlighting of the desired channel B(D), individual content as represented by C which is associated with the selected channel B(D) is then displayed, at step 86, substantially instantaneously with the selection by the user of the desired channel B(D). The individual content C is thereby simultaneously displayed with the displayed channel B(D) and the displayed category A(D). As seen in FIG. 2, the individual content C includes the information 46 which includes the links 52, and the extensions 54. Referring to FIG. 3, upon displaying the individual content C, the information as represented by D which relates to the selected channel B(D) and the selected category A(D) is then displayed, at step 88.

The information D which is displayed includes particular information E comprising an extension 54 which is displayed in the window 50, at step 90. The displayed particular information E is then highlighted, at step 92. If the particular information E displayed and highlighted comprises information which the user decides to view, at step 94, the particular information remains displayed, at step 90. However, if the user desires to view other particular information, at step 94, the user may then scan the particular information E, by clicking on an arrow 52, from the same screen 18, at step 96, until desired particular information as represented by E(D) is displayed, at step 98. The information D which is displayed, at step 88, also includes links 52 to other information, which links are represented by F, and which links F are displayed, at step 100, and also highlighted, at step 102. If the user does not desire to view the linked information, at step 104, the links remain displayed, at step 100. If, however, the user desires to view the linked information, at step 104, the user may then click on the links, in the same screen 18, at step 106, and the linked information as represented by F(L) is displayed, at step 108. In accordance with the invention, the user may at any point in the process decide to return, in the same screen 18, to the displayed categories A at step 60, and proceed from step 60 as desired.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A display system comprising:
   a display; and
   a single graphical user interface window presented on the display, comprising:
   a representation of a set of channels; and
   a representation of individual content items associated with each of the channels, wherein the individual content items include television programming and interactive data;
   wherein the single graphical user interface window enables a user to select an individual content item associated with a displayed channel;
   wherein if the interactive data is selected, then the representation of the set of channels and the interactive data are both displayed within the single graphical user interface window;
   wherein the single graphical user interface window displays the representation of the individual content items associated with a channel upon selection of the channel by the user;
   wherein the single graphical user interface window does not involve overlaying;
   wherein the single graphical user interface window simultaneously displays categories, channels, and content, and permits navigation in the single graphical user interface therethrough, such that a plurality of sets of channels that each correspond to a plurality of categories respectively; and wherein upon selection of a single category of the plurality of categories by the user, the corresponding set of channels of the plurality of sets of channels is displayed.

2. The display system of claim 1, wherein the single graphical user interface window comprises an area for displaying the representation of the individual content items, and wherein the area occupies a substantial portion of the display.

3. The display system of claim 1, wherein a connection to a source of the individual content is established through a communications interface.

4. The display system of claim 1, wherein the representation of the individual content items in each selectable channel includes information that is related to the selectable channel.

5. The display system of claim 1, wherein the representation of the sets of channels comprises sets of websites.

6. The display system of claim 1, wherein the single graphical user interface window comprises a front-end for worldwide-web access.

7. The display system of claim 1, wherein the representation of individual content items comprise hyperlinks, and further wherein the individual content item is selected by selecting a hyperlink associated with the individual content item.

8. A display system comprising:
a display; and
a single graphical user interface window presented on the display, comprising:
    a representation of a set of channels; and
    a representation of individual content items associated with each of the channels, wherein the individual content items include television programming, interactive data and extended content;
    wherein the single graphical user interface window enables a user to select individual content items associated with a displayed channel, and to select extended content;
    wherein if the interactive data is selected, the representation of the set of channels and the interactive data are both displayed within the single graphical user interface window;
    wherein the single graphical user interface window displays the representation of individual content items associated with a channel upon selection of the channel by the user,
wherein the single graphical user interface window does not involve overlaying;
wherein the single graphical user interface window simultaneously displays categories, channels, and content, and permits navigation in the single graphical user interface therethrough, such that a plurality of sets of channels that each correspond to a plurality of categories respectively; and
wherein upon selection of a single category of the plurality of categories by the user, the corresponding set of channels of the plurality of sets of channels is displayed.

9. The display system of claim 8, wherein the extended content includes a current time.

10. The display system of claim 8, wherein the extended content includes a graphical representation of a relation between a current time and a total range of time from a start to an end of a program.

11. The display system of claim 8, wherein the extended content includes embedded video.

12. A method of enabling a user to select an individual content item associated with a displayed channel, in a system that includes a single graphical user interface window, wherein the single graphical user interface window does not involve overlaying, including a representation of a set of channels and a representation of individual content items associated with each of the channels, wherein the individual content items include television programming and interactive data, the method comprising:
    displaying the representation of a plurality of the channels;
    enabling the user to navigate interactively in the individual content items;
    enabling the user to navigate among the individual content items from the graphical user interface window, wherein if the user navigates to the interactive data, then the representation of the plurality of channels and the interactive data are both displayed within the single graphical user interface window;
    enabling the user to select a desired channel;
    displaying the representation of the individual content items associated with a selected channel, wherein displaying the individual content is performed upon the selection of the desired channel;
    wherein the single graphical user interface window simultaneously displays categories, channels, and content, and permits navigation in the single graphical user interface therethrough, such that a plurality of sets of channels that each correspond to a plurality of categories respectively; and
    wherein upon selection of a single category of the plurality of categories by the user, the corresponding set of channels of the plurality of sets of channels is displayed.

13. The method of claim 12, wherein displaying the individual content enables the individual content items associated with the selected channel to be displayed with the set of channels.

14. The method of claim 12, wherein the individual content items in each selectable channel include program information that is related to the selectable channel, and include particular information related to the program information, the method further comprising:
    displaying the particular information associated with the selected channel;
    enabling the user to scan the particular information to locate desired particular information; and
    displaying the desired particular information.

15. The method of claim 12, wherein the individual content items include information that includes links to other information associated with the selected channel, the method further comprising:
    displaying the information that includes the links;
    enabling the user to activate a link to the other information; and
    displaying the linked information.

16. A computerized method comprising:
    displaying a single graphical user interface window, wherein the single graphical user interface window does not involve overlaying;
    displaying in the single graphical user interface window a representation of a set of channels;
    displaying in the single graphical user interface window a representation of individual content items, wherein the individual content items include television programming and interactive data;
    receiving, via the single graphical user interface window, user selections of a represented channel and a represented content item;
    displaying both the representation of the set of channels and the interactive data within the single graphical user interface window if the user selects the interactive data; and displaying the representation of the individual content items associated with a channel upon selection of a channel by the user;

wherein the single graphical user interface window simultaneously displays categories, channels, and content, and permits navigation in the single graphical user interface therethrough, such that a plurality of sets of channels that each correspond to a plurality of categories respectively; and wherein upon selection of a single category of the plurality of categories by the user, the corresponding set of channels of the plurality of sets of channels is displayed.

17. A single, interactive graphical user interface window to be presented on a display, the graphical user interface window comprising:

a representation of a set of channels; and a representation of individual content items associated with each of the channels, wherein the individual content items include television programming and interactive data;

wherein the single graphical user interface enables a user to select an individual content item associated with a displayed channel;

wherein if the interactive data is selected, then the representation of the set of channels and the interactive data are both displayed within the single graphical user interface window;

wherein the single graphical user interface window displays the representation of the individual content items associated with a channel upon selection of the channel by the user, wherein the single graphical user interface window does not involve overlaying;

wherein the single graphical user interface window simultaneously displays categories, channels, and content, and permits navigation in the single graphical user interface therethrough, such that a plurality of sets of channels that each correspond to a plurality of categories respectively; and wherein upon selection of a single category of the plurality of categories by the user, the corresponding set of channels of the plurality of sets of channels is displayed.

18. The graphical user interface window of claim 17, further comprising an area for displaying the representation of the individual content items, and wherein the area occupies a substantial portion of the display.

19. The graphical user interface window of claim 17, wherein a connection to a source of the individual content is established through a communications interface.

20. The graphical user interface window of claim 17, wherein the representation of the individual content items in each selectable channel includes information that is related to the selectable channel.

21. The graphical user interface window of claim 17, wherein the representation of the sets of channels comprises sets of websites.

22. The graphical user interface window of claim 17, further comprising a front-end for world-wide-web access.

23. The graphical user interface window of claim 17, wherein the representation of individual content items comprise hyperlinks, and further wherein the individual content item is selected by selecting a hyperlink associated with the individual content item.

* * * * *